(12) United States Patent
Feilen et al.

(10) Patent No.: US 11,573,549 B2
(45) Date of Patent: Feb. 7, 2023

(54) CONFIGURATION METHOD AND CONFIGURATION SYSTEM

(71) Applicant: Rohde & Schwarz GmbH & Co. KG, Munich (DE)

(72) Inventors: Michael Feilen, Munich (DE); Mikhail Volianskii, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 200 days.

(21) Appl. No.: 16/926,054

(22) Filed: Jul. 10, 2020

(65) Prior Publication Data
US 2022/0011733 A1    Jan. 13, 2022

(51) Int. Cl.
*G05B 19/042* (2006.01)
*G06N 5/02* (2006.01)
*G06N 3/02* (2006.01)

(52) U.S. Cl.
CPC .......... *G05B 19/0426* (2013.01); *G06N 3/02* (2013.01); *G06N 5/02* (2013.01); *G05B 2219/25124* (2013.01)

(58) Field of Classification Search
None
See application file for complete search history.

(56) References Cited

U.S. PATENT DOCUMENTS

| | | | |
|---|---|---|---|
| 2018/0225592 A1* | 8/2018 | Ponnuswamy | G06N 20/00 |
| 2019/0102676 A1* | 4/2019 | Nazari | G06N 3/0472 |
| 2019/0130285 A1* | 5/2019 | Snyder | G06Q 30/0631 |
| 2019/0280918 A1* | 9/2019 | Hermoni | H04L 63/1416 |
| 2022/0012644 A1* | 1/2022 | Clifton | G16H 50/30 |
| 2022/0092435 A1* | 3/2022 | Hasegawa | G06N 3/088 |

* cited by examiner

*Primary Examiner* — Jason D Mitchell
(74) *Attorney, Agent, or Firm* — Christensen O'Connor Johnson Kindness PLLC

(57) ABSTRACT

A configuration method for configuring an electronic device is described. The configuration method comprises: receiving at least one status parameter that is associated with at least one of an input parameter of the electronic device, an output parameter of the electronic device, a target output parameter of the electronic device, and a state of the electronic device; processing at least one status parameter by a first artificial intelligence module within a predefined time interval, thereby generating at least one first control parameter within the predefined time interval, wherein the at least one first control parameter is a rough estimate of an optimal control parameter for the electronic device; and processing at least one status parameter by a second artificial intelligence module, thereby generating at least one second control parameter wherein the at least one second control parameter is a more precise estimate of the optimal control parameter for the electronic device compared to the at least one first control parameter. Moreover, a configuration system is described.

15 Claims, 3 Drawing Sheets

CONFIGURATION METHOD AND CONFIGURATION SYSTEM

FIELD OF THE DISCLOSURE

Embodiments of the present disclosure generally relate to a configuration method for configuring an electronic device. Embodiments of the present disclosure further relate to a configuration system for configuring an electronic device.

BACKGROUND

Many electronic devices have different operational modes of processing an input signal and generating an output signal based on the input signal. In general, operational parameters of the respective electronic device have to be correctly adapted in order to correctly process the input signal according to the different operational modes.

Particularly, electronic measurement instruments, e.g. oscilloscopes or signal analyzers, usually have different measurement modes. For example, the measurement instrument may have different measurement settings for different voltage and/or current ranges that are to be measured.

In order to precisely measure properties of a certain device under test, the settings of the measurement instrument need to be precisely adapted to a particular measurement scenario at hand.

In principle, all different types of operational modes and the respectively associated sets of operational parameters for the electronic device could be computed beforehand (e.g. after an assembly of the electronic device). However, for modern electronic devices having several different operational modes and a large number of associated operational parameters, the resulting data volume may be very large, which results in high demands on the available memory in the electronic device.

Accordingly, there is a need for a configuration method and a configuration system that allow for a less memory-intensive configuration of an electronic device.

SUMMARY

Embodiments of the present disclosure provide a configuration method for configuring an electronic device. In an embodiment, the configuration method comprises the following steps:

receiving at least one status parameter that is associated with an input parameter of the electronic device, an output parameter of the electronic device, a target output parameter of the electronic device, and/or a state of the electronic device;

processing at least one status parameter by a first artificial intelligence circuit or module within a predefined time interval, thereby generating at least one first control parameter within the predefined time interval, wherein the at least one first control parameter is a rough estimate of an optimal control parameter for the electronic device; and processing at least one status parameter by a second artificial intelligence circuit or module, thereby generating at least one second control parameter wherein the at least one second control parameter is a more precise estimate of the optimal control parameter for the electronic device compared to the at least one first control parameter.

The configuration method according to the disclosure is based on the idea to determine at least one preliminary control parameter, namely the at least one first parameter, by the first artificial intelligence module. The preliminary control parameter may relate to a rough(er) estimation of the corresponding optimal control parameter compared to the second control parameter generated which relates to a (more) precise estimation.

In general, determining the second control parameter takes a longer time than determining the first control parameter, as the second control parameter is a more precise estimate of the at least one optimal control parameter.

However, the at least one first control parameter can be determined in a shorter amount of time (namely the predefined time interval), as the at least one first control parameter is only a rough estimate of the optimal control parameter.

Accordingly, the electronic device can be controlled to change to a preliminary operational mode based on the at least one first control parameter within the predetermined time interval.

Thus, the operational mode of the electronic device can be adapted even before the precise estimate of the optimal control parameter is available, namely the at least one second control parameter.

Moreover, there is no need to compute all possible operational modes and the respectively associated operational parameters before usage of the electronic device, as the operational parameters may be quickly adjusted on the fly based on the estimates of the optimal control parameter generated by the first artificial intelligence module and by the second artificial intelligence module.

Of course, several first control parameters and/or several second control parameters may be generated.

In some embodiments, a first control vector comprising several first control parameters and/or a second control vector comprising several second control parameters may be generated.

The first artificial intelligence module and/or the second artificial intelligence module may be integrated into the electronic device. Alternatively, the first artificial intelligence module and/or the second artificial intelligence module may be established separately from the electronic device.

The at least one status parameter may comprise additional information about the status of the electronic device. For example, the at least one status parameter may comprise additional information on physical parameters of the electronic device, e.g., constructional or rather operational parameters such as an admissible frequency range of the electronic device, and/or information on environmental parameters, such as temperature and/or humidity.

Optionally, the at least one status parameter may comprise at least one quality parameter that is associated with certain requirements regarding an output signal generated by the electronic device. For example, the at least one quality parameter may comprise information on a desired signal-to-noise ratio (SNR) and/or a desired gain factor.

According to an aspect of the present disclosure, at least one operational parameter of the electronic device is temporarily adapted based on the at least one first control parameter. More precisely, the at least one operational parameter may be adapted until the more precise estimate of the optimal control parameter, i.e. the at least one second control parameter, is available. Thus, the operational mode of the electronic device can be adapted within a short amount of time, namely within the predefined time interval.

According to another aspect of the present disclosure, the at least one operational parameter is temporarily adapted immediately after the at least one first control parameter is generated. Thus, the operational mode of the electronic device is adapted in the fastest way possible, namely as soon as the rough estimate of the optimal control parameter is available.

In a further embodiment of the present disclosure, the at least one operational parameter of the electronic device is adapted based on the second control parameter as soon as the second control parameter is generated. In other words, the rough estimate of the optimal control parameter is only used until the more precise estimate of the optimal control parameter, namely the at least one second control parameter, is available.

According to another aspect of the present disclosure, the second artificial intelligence module comprises an expert system. Thus, the at least one second control parameter is generated based on a set of rules, for example a set of if-then rules, that are configured to emulate the decision-making of a human expert. The set of rules is configured such that the expert system generates a precise estimate of the optimal control parameter, namely the at least one second control parameter.

According to an embodiment of the present disclosure, the first artificial intelligence module comprises a machine learning circuit(s) or module, wherein the machine learning module is trained to determine the at least one first control parameter based on the at least one status parameter. More precisely, the machine learning module may be trained to determine the at least one first control parameter within the predetermined time interval.

In some embodiments, the machine learning module comprises an artificial neural network. Accordingly, the artificial neural network is trained to generate the at least one first control parameter based on the at least one status parameter.

According to an aspect of the of the present disclosure, at least one machine learning parameter of the machine learning module is adapted based on the at least one first control parameter and based on the at least one second control parameter. In other words, the machine learning module may repeatedly be trained based on the output of the second artificial intelligence module, for example based on the output of the expert system. This way, the quality of the at least one first control parameter may automatically be improved even during usage of the electronic device.

In some embodiments, a deviation between the at least one first control parameter and the at least one second control parameter is determined, wherein the at least one machine learning parameter is adapted based on the deviation. More precisely, the at least one machine learning parameter may be adapted such that the deviation is reduced, for example minimized.

According to a further embodiment of the present disclosure, the at least one machine learning parameter is adapted based on a cost functional. In general, the cost functional serves as a measure for the accuracy of the at least one first control parameter compared to the at least one second control parameter. In some embodiments, the cost functional may depend on a deviation between the at least one first control parameter and the at least one second control parameter. Thus, the at least one machine learning parameter may be adapted such that a value of the cost functional is reduced, for example minimized, in order to train the machine learning module.

It is noted that minimizing the cost functional in order to train the machine learning module corresponds to one possible choice of the cost functional. Of course, the cost functional may also have to be maximized in order to train the machine learning module if the previous choice of the cost functional is multiplied by (−1).

The predefined time interval may be adjustable. In some embodiments, the predefined time interval may be adjustable by a user, e.g. via a suitable user interface of the electronic device. In other words, a user may choose after which time the electronic device switches into a preliminary operational mode. Generally, the quality of the rough estimation depends on the time interval set. Accordingly, a longer time interval provided provides a more accurate estimation compared to a very short time interval. However, the user is enabled to adjust the time interval individually.

In general, a larger predefined time interval is associated with a more precise first control parameter, but the electronic device enters the preliminary operational mode later. A shorter predefined time interval is associated with a less precise first control parameter, but the electronic device enters the preliminary operational mode faster. Thus, by adjusting the predefined time interval, a trade-off between an accuracy of the first control parameter and the time needed for entering the preliminary operational mode can be made.

According to an aspect of the present disclosure, the at least one first control parameter and the at least one second control parameter are generated simultaneously. This does not mean that the at least one first control parameter and the at least one second control parameter have to be available at the same time. However, the respective at least one status parameter is processed by the first artificial intelligence module and the second artificial intelligence module in parallel, such that the at least one first control parameter and the at least one second control parameter are computed at least partially simultaneously (until the at least one first control parameter is generated). Once the at least one first control parameter is generated by the first artificial intelligence module, the first control parameter generated is forwarded to the second artificial intelligence module. The second artificial intelligence module may take the first control parameter generated into account in order to accelerate the generation of the second control parameter having a higher accuracy compared to the first one.

In some embodiments, the electronic device is established as a measurement device. For example, the electronic device may be established as as an oscilloscope, as a signal analyzer, as spectrum analyzer, or as a vector network analyzer. Accordingly, the different operational modes described above may correspond to different measurement modes of the measurement device.

However, the electronic device may be established as any other type of electronic device that is configured to receive an input signal and to generate an output signal based on the input signal. For example, the electronic device may be established as a signal generator or as a receiver.

Embodiments of the present disclosure further provide a configuration system for configuring an electronic device. The configuration system comprises a first artificial intelligence circuit or module and a second artificial intelligence circuit or module. The first artificial intelligence module and the second artificial intelligence module each are configured to receive at least one status parameter that is associated with at least one of an input parameter of the electronic device, an output parameter of the electronic device, a target output parameter of the electronic device, and a state of the electronic device. The first artificial intelligence module is configured to process at least one status parameter by a first artificial intelligence module within a predefined time interval, thereby generating at least one first control parameter within the predefined time interval, wherein the at least one first control parameter is a rough estimate of an optimal control parameter for the electronic device. The second artificial intelligence module is configured to process at least one status parameter by a second artificial intelligence module, thereby generating at least one second control parameter, wherein the at least one second control parameter is a more precise estimate of the optimal control parameter for the electronic device compared to the at least one first control parameter.

Regarding the advantages and further properties of the configuration system, reference is made to the explanations given above with respect to the configuration method, which also hold for the configuration system and vice versa.

In some embodiments, the configuration system is configured to perform the configuration method described above.

According to an aspect of the present disclosure, the second artificial intelligence module comprises an expert system. Thus, the at least one second control parameter is generated based on a set of rules, for example a set of if-then rules, that are built to emulate the decision-making of a human expert. The set of rules is configured such that the expert system generates a precise estimate of the optimal control parameter, namely the at least one second control parameter.

According to another aspect of the present disclosure, the first artificial intelligence module comprises a machine learning module, wherein the machine learning module is trained to determine the at least one first control parameter based on the at least one status parameter. More precisely, the machine learning module may be trained to determine the at least one first control parameter within the predetermined time interval.

In an embodiment of the present disclosure, the machine learning module comprises an artificial neural network. Accordingly, the artificial neural network is trained to generate the at least one first control parameter based on the at least one status parameter.

In some embodiments, the machine learning module is configured to adapt at least one machine learning parameter of the machine learning module based on s the aid at least one first control parameter and based on the at least one second control parameter. In other words, the machine learning module may repeatedly be trained based on the output of the second artificial intelligence module, for example based on the output of the expert system. This way, the quality of the at least one first control parameter may be improved even during usage of the electronic device.

The configuration system may further comprise a control circuit or module, the control module being configured to temporarily adapt at least one operational parameter of the electronic device based on the at least one first control parameter. More precisely, the at least one operational parameter may be adapted until the more precise estimate of the optimal control parameter, i.e. the at least one second control parameter, is available. Thus, the operational mode of the electronic device may be adapted within a short amount of time, namely within the predefined time interval.

Generally, the time required for adapting the operational mode of the electronic device based on the first control parameter, namely the rough estimate, is controllable by setting the predefined time interval accordingly.

According to an aspect of the present disclosure, the control module is configured to adapt the at least one operational parameter of the electronic device based on the second control parameter as soon as the second control parameter is generated. In other words, the rough estimate of the optimal control parameter is only used until the more precise estimate of the optimal control parameter, namely the at least one second control parameter, is available.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
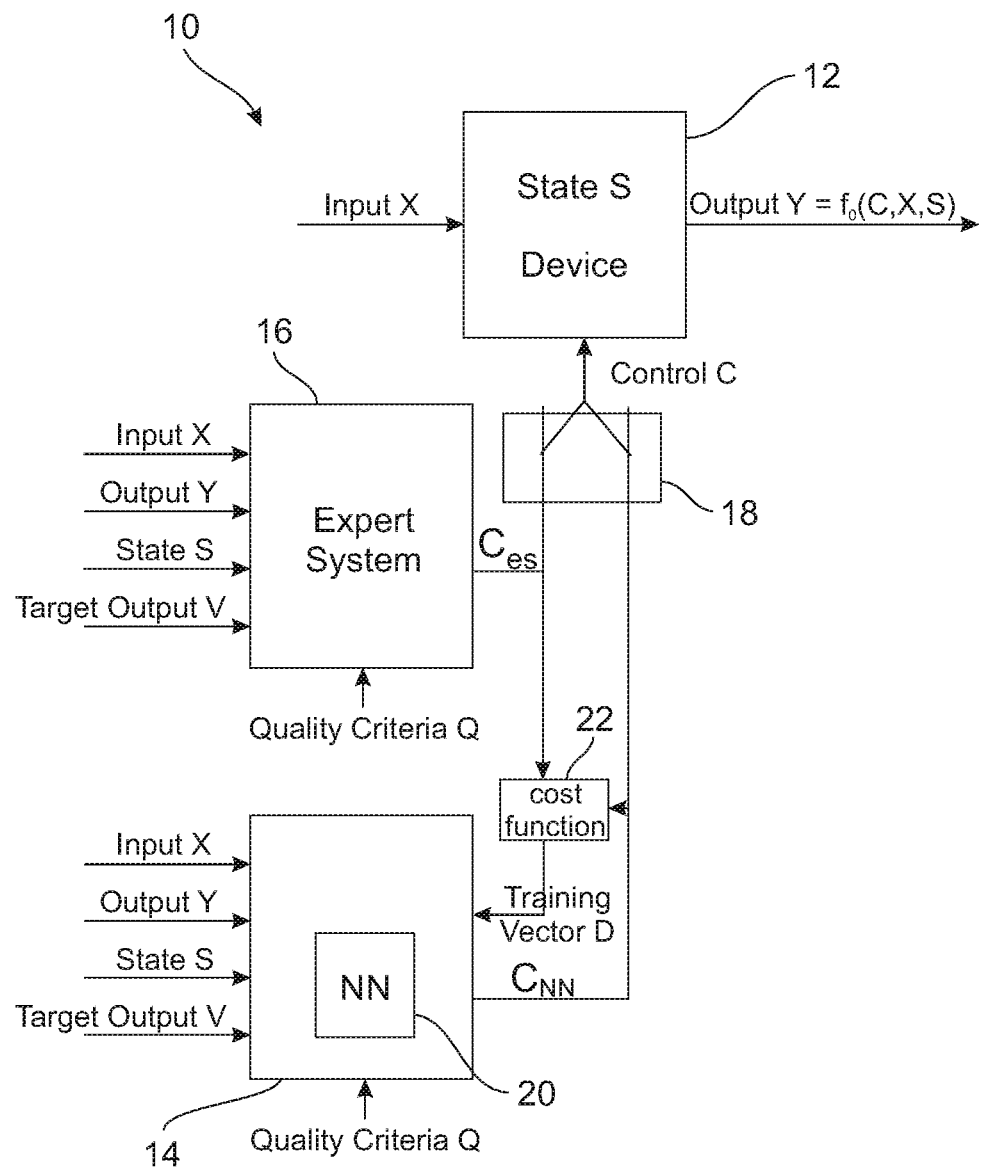
FIG. 1 schematically shows a block diagram of a configuration system according to an embodiment of the present disclosure.

FIG. 1 schematically shows a block diagram of a configuration system 10. The configuration system 10 comprises an electronic device 12, a first artificial intelligence circuit or module 14, a second artificial intelligence circuit or module 16, and a control circuit or module 18.

Therein and in the following, the term "module" is understood to denote components that comprise suitable hardware and/or software. Thus, the term "module" comprises the meanings "pure software", "pure hardware" and "combination of software and hardware", as will be appreciated by the person skilled in the art.

It is noted that while the first artificial intelligence module 14, the second artificial intelligence module 16, and the control module 18 are shown to be established separately from the electronic device 12, the first artificial intelligence module 14, the second artificial intelligence module 16, and/or the control module 18 may also be integrated into the electronic device 12.

In general, the electronic device 12 may be any device that is configured to receive an input signal X and to generate an output signal Y based on the input signal X. In some embodiments, the electronic device 12 may be established as a measurement and/or analysing device, e.g. as an oscilloscope, as a signal analyzer, as spectrum analyzer, or as a vector network analyzer. Thus, the input signal X may be associated with a measured signal, while the output signal Y may be a corresponding measurement value that is output by the electronic device 12. As further examples, the electronic device 12 may be established as a signal generator or as a receiver, for example as an RF receiver.

Figure 2:
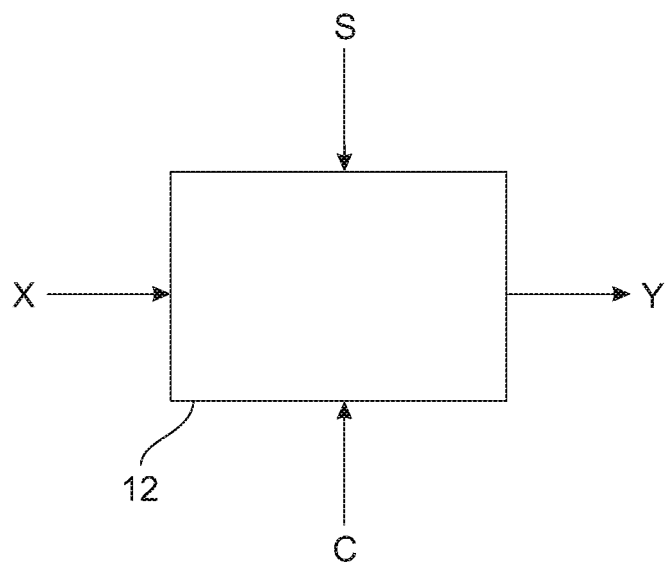
FIG. 2 schematically shows a portion of the configuration system of FIG. 1 comprising an electronic device.

FIG. 2 illustrates the general functionality of the electronic device 12. As already mentioned above, the electronic device 12 receives an input signal X. Moreover, the electronic device 12 may be configured to receive a state signal S, wherein the state signal comprises additional information about the status of the electronic device 12.

For example, the state signal S may comprise additional information on physical parameters of the electronic device 12, e.g. information on constructional details such as an admissible frequency range of the electronic device 12, and/or information on environmental parameters, such as temperature and/or humidity.

The electronic device 12 may comprise or may be connected to corresponding sensors that are configured to measure physical parameters inside or outside of the electronic device 12, thereby generating the state signal S. Moreover, the electronic device 12 receives a control vector C from the control module 18. Therein, the control vector C comprises instructions for the electronic device 12 to adapt at least one operational parameter of the electronic device 12. Accordingly, an operational mode of the electronic device 12 may be adjusted based on the control vector C. For example, the electronic device 12 may be switched between different measurement modes based on the control vector C.

The electronic device 12 generates the output signal Y based on the input signal X, the control vector C, and the state signal S. In other words, the output signal Y is a function of the input signal X, the control vector C, and the state signal S, i.e. $Y=f_O(C, X, S)$.

The first artificial intelligence module 14 comprises a machine learning circuit or module 20. In an embodiment, the machine learning module 20 comprises an artificial neural network (denoted by "NN" in FIG. 1). In general, the first artificial intelligence module 14, or rather the machine learning module is configured to roughly estimate an optimal control vector $C_{opt}$ for the electronic device 12. This will be described in more detail below.

The second artificial intelligence module 16 is established as an expert system for the electronic device 12. Generally, the second artificial intelligence module 16 or rather the expert system is configured to estimate the optimal control parameter $C_{opt}$ mentioned above based on a set of rules, for example a set of if-then rules. This set of rules is configured to emulate the decision-making of a human expert.

Figure 3:
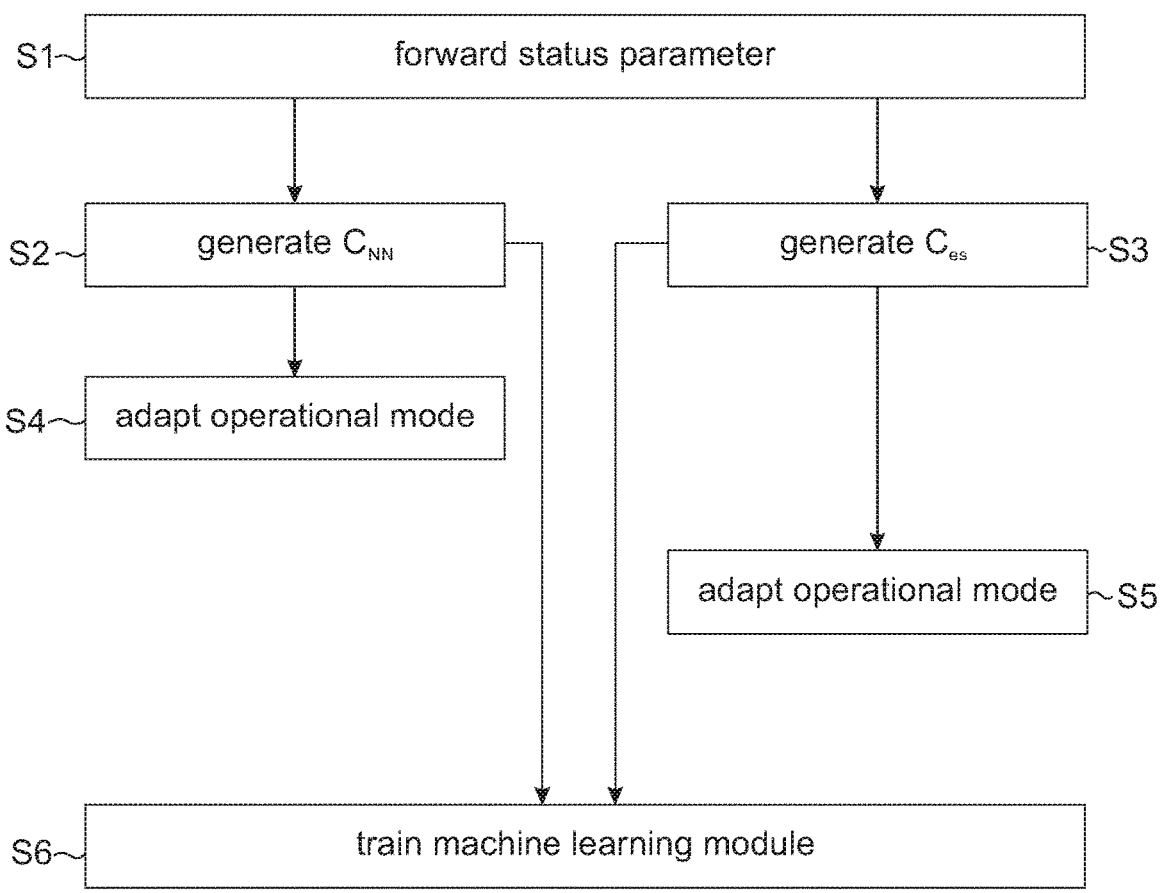
FIG. 3 shows a flow chart of a configuration method according to an embodiment of the present disclosure.

Accordingly, the second artificial intelligence module 16 is configured to precisely estimate the optimal control vector $C_{opt}$ for the electronic device 12. This will be described in more detail below The configuration system 10 is configured to perform the configuration method for configuring the electronic device 12 that is explained in the following with reference to FIG. 3.

At least one status parameter is respectively forwarded to the first artificial intelligence module 14 and to the second artificial intelligence module 16 (step S1).

Therein, the at least one status parameter comprises one or more of the following: an input parameter of the electronic device 12 that is associated with a momentary input signal X, an output parameter of the electronic device 12 that is associated with a momentary output signal Y, a target output parameter of the electronic device 12 that is associated with an output signal V that is to be obtained, and a state of the electronic device 12 that is associated with a momentary state signal S.

Optionally, the at least one status parameter may comprise at least one quality parameter Q that is associated with certain requirements regarding the output signal Y generated by the electronic device 12. For example, the at least one quality parameter may comprise information on a desired signal-to-noise ratio and/or a desired gain factor.

Figure 4:
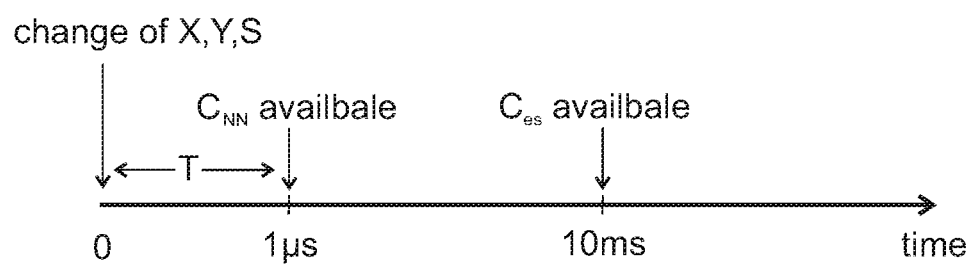
FIG. 4 shows a time chart of several steps of the configuration method according to the disclosure.

As is illustrated in FIG. 4, at least one of the input signal X, the output signal Y and the state signal S may have changed, such that the electronic device may have to be reconfigured.

The at least one status parameter forwarded to the first artificial intelligence module 14 is processed by the first artificial intelligence module 14, thereby generating a first control vector $C_{NN}$ comprising several first control parameters via the artificial neural network within a predefined time period T (step S2).

In general, the first control vector $C_{NN}$ is a function of the at least one status parameter, for example of all status parameters received by the first artificial intelligence module 14. In other words, $C_{NN}$ can be written as $C_{NN}=f_{NN}(X, Y, S, V, Q)$. The first control vector $C_{NN}$ corresponds to a rough estimate of an optimal control vector $C_{opt}$ for the electronic device 12.

In parallel to step S2, the at least one status parameter forwarded to the second artificial intelligence module 16 is processed by the second artificial intelligence module 16, thereby generating a second control vector $C_{es}$ comprising several second control parameters via the expert system (step S3). Hence, the first control vector $C_{NN}$ and the second control vector $C_{es}$ may be generated simultaneously, which means that their respective generation is initiated simultaneously.

In general, the second control vector $C_{es}$ is a function of the at least one status parameter, for example of all status parameters received by the second artificial intelligence module 16. In other words, $C_{es}$ can be written as $C_{es}=f_{es}(X, Y, S, V, Q)$.

The second control vector $C_{es}$ corresponds to a more precise estimate of the optimal control vector $C_{opt}$ for the electronic device 12, for example compared to the rough estimate of the optimal control vector $C_{opt}$ for the electronic device 12 provided by the first control vector $C_{NN}$.

In general, determining the second control vector $C_{es}$ takes a longer time than determining the first control vector $C_{NN}$, as the second control vector $C_{es}$ is a more precise estimate of the at least one optimal control vector $C_{opt}$.

However, the first control vector $C_{NN}$ can be determined in a shorter amount of time (namely the predefined time interval T), as the first control vector is only a rough estimate of the optimal control vector $C_{opt}$.

In the example shown in FIG. 4, the first control vector $C_{NN}$ is available after 1 μs, while the second control vector $C_{es}$ is available after 10 ms.

In order to adapt the operational mode of the electronic device 12 as fast as possible, the electronic device 12 is controlled by the control module 18 to enter a preliminary operational mode based on the first control vector $C_{NN}$ immediately after the first control vector $C_{NN}$ is available, i.e. within or shortly after the predetermined time interval T (step S4).

The predefined time interval T may be adjustable. In some embodiments, the predefined time interval T may be adjustable by a user, e.g. via a suitable user interface of the electronic device 12. In other words, a user may choose after which time the electronic device 12 switches into the preliminary operational mode.

In the preliminary operational mode, the output signal Y generated by the electronic device 12 may not be equal to the desired output signal V because the first control vector $C_{NN}$ is only a rough estimate of the optimal control vector $C_{opt}$. However, the output signal Y may at least be approximately equal to the desired output signal V.

In general, a larger predefined time interval T is associated with a more precise first control vector $C_{NN}$, but the electronic device 12 enters the preliminary operational mode later.

Conversely, a shorter predefined time interval T is associated with a less precise first control vector $C_{NN}$, but the electronic device 12 enters the preliminary operational mode faster.

Thus, by adjusting the predefined time interval T, a trade-off between an accuracy of the first control vector $C_{NN}$ and the time needed for entering the preliminary operational mode can be made.

As soon as the second control vector $C_{es}$ is available, the electronic device 12 is controlled by the control module 18 to enter a corresponding operational mode (step S5). Accordingly, the at least one operational parameter of the electronic device 12 was only temporarily adapted based on the at least one first control parameter or rather the first control vector $C_{NN}$, namely until the second control vector $C_{es}$ becomes available.

In that operational mode of the electronic device 12, the output signal Y of the electronic device 12 may be closer to the desired output signal V because the second control vector $C_{es}$ is a more precise estimate of the optimal control vector $C_{opt}$.

Summarizing, the operational mode of the electronic device 12 is adapted in two increments. The operational mode is adjusted a first time based on the rough estimate of the optimal control vector $C_{opt}$ as soon as it is available, i.e. based on the first control vector $C_{NN}$. In this preliminary operational mode, the electronic device 12 is functional, but the output signal Y generated by the electronic device 12 in the preliminary operational mode may not be perfect.

The operational mode is adjusted a second time based on the more precise estimate of the optimal control vector $C_{opt}$ as soon as it is available, i.e. based on the second control vector $C_{es}$. In this operational mode, the electronic device 12 is fully functional, and the output signal Y generated by the electronic device 12 may be very close or identical to the desired output signal V.

Generally, the at least one first control parameter and the at least one second control parameter may be generated simultaneously. This means that the first artificial intelligence module 14 and the second artificial intelligence module 16 may simultaneously start to generate the respective control parameter. However, they do not finish the respective generation simultaneously since the first control parameter is a rougher estimation compared to the second control parameter, yielding in less time required to generate the first control parameter compared to the second one. As already mentioned above, the time required to generate the first control parameter can be set by the user, namely by defining the time interval previously, thereby obtaining the predefined time interval T.

The second control vector $C_{es}$ and the first control vector $C_{NN}$ may be used to train the machine learning module 20, for example the artificial neural network (step S6).

As already explained above, the second control vector $C_{es}$ is a more precise estimate of the optimal control vector $C_{opt}$ than the first control vector $C_{NN}$. Thus, the second control vector $C_{es}$ can be used as a target output for the machine learning module 20. In other words, the second control vector $C_{es}$ can be used as labeled data for the machine learning module 20.

More precisely, a deviation of the first control vector $C_{NN}$ from the second control vector $C_{es}$ is determined and used as an input for a cost functional 22 (cf. FIG. 1).

The cost functional 22 further depends on machine learning parameters of the machine learning module 20.

Generally, the machine learning parameters correspond to operational parameters of the machine learning module 20, wherein the machine learning module generates the first control vector $C_{NN}$ based on these machine learning parameters.

In some embodiments, the machine learning parameters comprise weighting factors of individual neurons or groups of neurons of the artificial neural network.

The machine learning parameters of the machine learning module 20 are adapted such that a value of the cost functional 22 is reduced, for example minimized.

A corresponding training vector D may be generated and forwarded to the machine learning module 20, and the corresponding operational parameters of the machine learning module 20 (the machine learning parameters) may be adapted based on the training vector D.

Accordingly, the first control vector $C_{NN}$ may be a function of the training vector D, i.e. $C_{NN}=f_{NN}(X, Y, S, V, Q, D)$.

Thus, the machine learning module 20 may repeatedly be trained based on the second control vector $C_{es}$ generated by the expert system of the second artificial intelligence module 16. This way, the quality of first control vector $C_{NN}$ may automatically be improved even during usage of the electronic device 12.

It is noted that minimizing the cost functional in order to train the machine learning module 20 corresponds to one possible choice of the cost functional 22. Of course, the cost functional 22 may also have to be maximized in order to train the machine learning module 20 if the previous choice of the cost functional made above is multiplied by (−1).

Hence, the at least one machine learning parameter of the machine learning module 20 is adapted based on the at least one first control parameter, for example the first control vector $C_{NN}$, and based on the at least one second control parameter, for example the second control vector $C_{es}$.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like. In some embodiments, the functionality described herein can be implemented by special purpose hardware-based computer systems or circuits, etc., or combinations of special purpose hardware and computer instructions.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, of portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

According to some embodiments, many individual steps of a process may or may not be carried out utilizing computer or computing based systems described herein, and the degree of computer implementation may vary, as may be desirable and/or beneficial for one or more particular applications.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A configuration method for configuring an electronic device, said configuration method comprising:

receiving at least one status parameter that is associated with at least one of an input parameter of said electronic device, an output parameter of said electronic device, a target output parameter of said electronic device, and a state of said electronic device;

processing at least one status parameter by a first artificial intelligence module within a predefined time interval, thereby generating at least one first control parameter within said predefined time interval, wherein said at least one first control parameter is a rough estimate of an optimal control parameter for said electronic device; and processing at least one status parameter by a second artificial intelligence module, thereby generating at least one second control parameter, wherein said at least one second control parameter is a more precise estimate of said optimal control parameter for said electronic device compared to said at least one first control parameter, wherein the at least one operational parameter of said electronic device is temporarily adapted based on said at least one first control parameter immediately after said at least one first control parameter is generated, such that the electronic device is controlled to change to a preliminary operational mode based on the at least one first control parameter within the predetermined time interval, and wherein said at least one operational parameter of said electronic device is adapted based on said second control parameter as soon as said second control parameter is generated.

2. The configuration method of claim 1, wherein said second artificial intelligence module comprises an expert system.

3. The configuration method of claim 1, wherein said first artificial intelligence module comprises a machine learning module, wherein said machine learning module is trained to determine said at least one first control parameter based on said at least one status parameter.

4. The configuration method of claim 3, wherein said machine learning module comprises an artificial neural network.

5. The configuration method of claim 3, wherein at least one machine learning parameter of said machine learning module is adapted based on said at least one first control parameter and based on said at least one second control parameter.

6. The configuration method of claim 5, wherein a deviation between said at least one first control parameter and said at least one second control parameter is determined, and wherein said at least one machine learning parameter is adapted based on said deviation.

7. The configuration method of claim 5, wherein said at least one machine learning parameter is adapted based on a cost functional.

8. The configuration method of claim 1, wherein said predefined time interval is adjustable.

9. The configuration method of claim 1, wherein said at least one first control parameter and said at least one second control parameter are generated simultaneously.

10. The configuration method of claim 1, wherein said electronic device is established as a measurement device.

11. A configuration system for configuring an electronic device, said configuration system comprising a first artificial intelligence module and a second artificial intelligence module, said first artificial intelligence module and said second artificial intelligence module each being configured to receive at least one status parameter that is associated with at least one of an input parameter of said electronic device, an output parameter of said electronic device, a target output parameter of said electronic device, and a state of said electronic device, said first artificial intelligence module being configured to process at least one status parameter within a predefined time interval, thereby generating at least one first control parameter within said predefined time interval, wherein said at least one first control parameter is a rough estimate of an optimal control parameter for the electronic device, and said second artificial intelligence module being configured to process at least one status parameter, thereby generating at least one second control parameter wherein said at least one second control parameter is a more precise estimate of said optimal control parameter for the electronic device compared to said at least one first control parameter, wherein the configuration system comprises a control circuit, said control circuit being configured to temporarily adapt at least one operational parameter of said electronic device based on said at least one first control parameter immediately after said at least one first control parameter is generated, such that the electronic device is controlled to change to a preliminary operational mode based on the at least one first control parameter within the predetermined time interval, and wherein said control circuit is configured to adapt said at least one operational parameter of said electronic device based on said second control parameter as soon as said second control parameter is generated.

12. The configuration system of claim 11, wherein said second artificial intelligence module comprises an expert system.

13. The configuration system of claim 11, wherein said first artificial intelligence module comprises a machine learning module, wherein said machine learning module is trained to determine said at least one first control parameter based on said at least one status parameter.

14. The configuration system of claim 13, wherein said machine learning module comprises an artificial neural network.

15. The configuration system of claim 13, wherein said machine learning module is configured to adapt at least one machine learning parameter of said machine learning module based on said at least one first control parameter and based on said at least one second control parameter.

* * * * *